United States Patent
Wideman et al.

(10) Patent No.: US 6,348,539 B1
(45) Date of Patent: Feb. 19, 2002

(54) PNEUMATIC TIRE HAVING A TREAD CONTAINING DICYCLOPENTADIENE/BETA-PINENE RESIN

(75) Inventors: Lawson Gibson Wideman, Hudson; Mark Leslie Kraleyich, Jr., Copley; Edward John Blok, Wadsworth; Paul Harry Sandstrom, Tallmadge, all of OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 21 days.

(21) Appl. No.: 09/714,581

(22) Filed: Nov. 16, 2000

Related U.S. Application Data

(62) Division of application No. 09/377,565, filed on Aug. 19, 1999, now Pat. No. 6,201,059.

(51) Int. Cl.[7] ............................................. C08L 45/00
(52) U.S. Cl. ....................... 524/518; 524/493; 524/495; 152/450; 152/565
(58) Field of Search .................. 524/493, 495, 524/518; 152/450, 565

(56) References Cited

U.S. PATENT DOCUMENTS

| | | | |
|---|---|---|---|
| 3,408,253 A | 10/1968 | Eckert et al. | 161/253 |
| 3,466,267 A | 9/1969 | Derfer | 260/80.7 |
| 3,634,374 A | 1/1972 | Bell | 260/87.5 |
| 3,784,530 A | 1/1974 | Osborn et al. | 260/80.7 |
| 3,927,144 A | 12/1975 | Hayashi et al. | 260/888 |
| 3,981,958 A | 9/1976 | Nakashima et al. | 260/878 |
| 4,038,346 A | 7/1977 | Feeney | 260/887 |
| 4,064,922 A | 12/1977 | Farber et al. | 152/347 |
| 4,068,062 A | 1/1978 | Lepert | 526/76 |
| 4,102,834 A | 7/1978 | Morimoto et al. | 260/4 |
| 4,367,732 A * | 1/1983 | Poulsen et al. | 128/156 |
| 4,687,794 A | 8/1987 | Huddleston | 523/351 |
| 4,739,036 A | 4/1988 | Colvin et al. | 528/389 |
| 4,740,559 A | 4/1988 | Johansson | 525/185 |
| 4,752,507 A | 6/1988 | Johansson | 427/385.5 |
| 4,824,921 A | 4/1989 | Luvinh | 526/237 |
| 5,504,137 A | 4/1996 | Sandstrom et al. | 524/492 |
| 5,580,919 A | 12/1996 | Agostini et al. | 524/430 |
| 5,691,432 A | 11/1997 | Williams | 526/283 |
| 5,693,731 A * | 12/1997 | Williams et al. | 526/224 |
| 5,901,766 A | 5/1999 | Sandstrom et al. | 152/209 |
| 6,201,059 B1 * | 3/2001 | Wideman et al. | 524/518 |

FOREIGN PATENT DOCUMENTS

| | | | |
|---|---|---|---|
| EP | 0063092 | 10/1982 | C08L/21/00 |
| EP | 0249904 | 12/1987 | C08F/240/00 |
| EP | 0899297 | 3/1999 | C08L/21/00 |

OTHER PUBLICATIONS

Chemical Abstracts, 56115s, vol. 90, 1979.

* cited by examiner

*Primary Examiner*—Edward J. Cain
*Assistant Examiner*—Katarzyna I Wyrozebski-Lee
(74) *Attorney, Agent, or Firm*—Bruce J. Hendricks

(57) ABSTRACT

This invention relates to a polymeric resin which contains from 35 to 65 percent by weight of polymeric units derived from dicyclopentadiene and from 65 to 35 percent by weight of polymeric units derived from beta-pinene. The polymeric resins are particularly useful in improving traction of the rubber when used in tire treads.

7 Claims, No Drawings

PNEUMATIC TIRE HAVING A TREAD CONTAINING DICYCLOPENTADIENE/BETA-PINENE RESIN

This is a Divisional of application Ser. No. 09/377,565, filed on Aug. 19, 1999, presently U.S. Pat. No. 6,201,059

BACKGROUND OF THE INVENTION

This invention relates to a polymeric resin which is the reaction product of the polymerization reaction between dicyclopentadiene and beta-pinene. Use of the polymeric resins of the present invention in a rubber tread stock improves the traction and handling of the tire.

SUMMARY OF THE INVENTION

The present invention relates to rubber compositions containing a polymeric dicyclopentadiene/beta-pinene resin. The polymeric resins of the present invention have a softening point ranging from about 100° C. to about 170° C., and a molecular weight distribution ranging from about 550 to about 55,000.

DETAILED DESCRIPTION OF THE INVENTION

There is disclosed a rubber stock comprising (1) a rubber selected from the group consisting of natural rubber, rubber derived from a diene monomer or mixtures thereof, and (2) a polymeric resin composition which contains from 35 to 65 percent by weight of polymeric units derived from dicyclopentadiene and from 65 to 35 percent by weight of polymeric units derived from beta-pinene.

In addition, there is disclosed a pneumatic tire having a tread comprised of a rubber stock comprising (1) a rubber selected from the group consisting of natural rubber, rubber derived from a diene monomer or mixtures thereof, and (2) a polymeric resin composition consisting essentially of the reaction product of the polymerization reaction between dicyclopentadiene and beta-pinene; said resin having a softening point ranging from about 50 to about 220° C. and a molecular weight ranging from about 500 to about 42,000.

The terms "polymeric compound" and "polymer" when used to describe the resins of the present invention are intended to only include those molecules which contain a monomeric unit derived from dicyclopentadiene and/or beta-pinene and where at least one of the monomeric units derived from the dicyclopentadiene or beta-pinene is repeated. Therefore, the compounds formed by the reaction of a single dicyclopentadiene molecule and a single beta-pinene are not polymeric as the term is used herein. The term monomeric unit means a structure that occurs in a polymeric compound and which differs from the structure of dicyclopentadiene or beta-pinene due to changes resulting from molecular reorientation during the linking to the adjacent structure. These changes may include addition to a double bond or the addition or removal of a hydrogen atom from the dicyclopentadiene or beta-pinene.

The resin for use in the present invention contains from 35 to 65 percent by weight of polymeric units derived from dicyclopentadiene and from 65 to 35 percent by weight of polymeric units derived from beta-pinene. Preferably, from 45 to 55 percent by weight of the polymeric units are derived from dicyclopentadiene and from 45 to 55 percent by weight of the polymeric units are derived from beta-pinene.

As can be appreciated by one skilled in the art, commercially available hydrocarbon streams are rarely pure, but rather contain many isomers or derivatives. Therefore, it is contemplated herein that from 0 to 20 weight percent of the polymeric resin may be derived from a monomer other than dicyclopentadiene or beta-pinene. Preferably, from 0 to 10 weight percent of the polymeric resin may be derived from a monomer other than dicyclopentadiene or beta-pinene. Representative examples of such monomers include alpha-pinene, methyldicyclopentadiene and the like.

The molar ratio of the dicyclopentadiene to beta-pinene in the polymerization reaction may vary, depending on the desired properties of the final polymeric product. For example, the molar ratio of the dicyclopentadiene to beta-pinene as starting material may range from about 1:2 to about 2:1. The preferred molar ratio of dicyclopentadiene to beta-pinene may range from about 1:1 to 2:1 as starting material. The most preferred ratio ranges from about 1.1:1 to 1:1.1. As to the final product, the molar ratio of polymeric units derived from the dicyclopentadiene to beta-pinene may range from about 1:2 to 2:1 with a range of from about 1.1:1 to 1:1.1 being preferred.

The polymerization reaction between the dicyclopentadiene and the beta-pinene may be a thermal (no catalyst) polymerization, or catalyzed, i.e., conducted in the presence of an acid catalyst. Examples of acid catalysts that may be used include Bronsted acid and Lewis acid-type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherates. The choice of a particular catalyst is dependent upon factors including the melting or boiling points of the reactants, desired rate of reaction, solvent, and pressure and temperature limitation of the production equipment, etc. When higher yields are desired, the metal halides or their etherates may be utilized. The preferred acid catalysts are $BF_3$ and $AlCl_3$. The most preferred catalyst is $AlCl_3$.

In the catalyzed polymerization process, the amount of catalyst may range from about 0.1 to about 20 weight percent of catalyst based on the total weight of reactants to be polymerized. Preferably, a range of from about 3 to about 5 weight percent of catalyst is preferred. The optimum concentration of catalyst depends on the nature of the solvent, if any, which affects the solubility of the catalyst as well as on the stirring efficiency inside the polymerization reactor. High catalyst concentration reduces the resin molecular weight distribution and, therefore, limits the amount of feed additive required for controlling the resin molecular weight.

The polymerization reaction may be carried out neat (without solvent) at or above the melting points of the reactants, or can be carried out in the presence of a solvent. The solvent may be an aliphatic $C_6$–$C_{12}$ hydrocarbon, an aromatic or haloaromatic ($C_6$–$C_9$) hydrocarbon, or a $C_6$–$C_9$ aliphatic halohydrocarbon. Examples of suitable solvents include hexane, heptane, cyclohexane, benzene, toluene, xylene, and chlorobenzene. The preferred solvents are hexane and cyclohexane.

The polymerization reaction may be conducted under a variety of operating conditions. The reaction pressure may vary and range from about one atmosphere to about 100 atmospheres with a pressure of from about two atmospheres to about ten atmospheres being preferred. The reaction temperature may range from about 0 to 100° C. with a preferred range being from about 30 to 50° C.

Depending on the reactivity of the reactants, amount of catalyst, reaction pressure and reaction temperature, the reaction time may vary. Generally speaking, the reaction time varies from about 1 to about 8 hours.

The molecular weight distribution of the polymeric resin of the present invention may range from about 550 to about 55,000. Preferably, the molecular weight distribution of the polymeric resin ranges from about 550 to about 52,500.

The polymeric resin composition has a softening point ranging from about 100 to about 170° C. For the purposes of the present invention, the term "softening point" is used to describe the temperature range from when wetting occurs in a capillary melting point tube to where the resin is completely liquid. Representative of suitable equipment to determine the relative softening point is a Thomas-Hoover Melting Point apparatus equipped with a silicone oil bath. In accordance with the preferred embodiment, the polymeric resin composition has a softening point ranging from about 130 to about 160° C.

Rubber stocks containing natural rubber or rubbers derived from a diene monomer may be modified with the resin compositions of the present invention. Examples of rubbers derived from a diene monomer include substituted and unsubstituted, saturated and unsaturated, synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) when the monomers are combined in the random distribution or block form. In addition to the diene monomers, other monomers may be used. Of all the monomers that may be used, the monomers may be substituted or unsubstituted and may possess one or more double bonds, for example, diene monomers, both conjugated and nonconjugated, and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene, homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified by the resins of the present invention are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

The amount of polymeric resins that may be used with the diene containing polymers may vary and depend on the polymer to be modified, the particular polymeric resin, the desired degree of modification and the like. Generally speaking, the polymeric resin is used in amounts ranging from about 5 to about 50 parts per hundred (phr) of diene polymer. Preferably, the polymeric resin is used in amounts of from about 5 to about 25 phr, with a range of from about 10 to about 25 phr being particularly preferred.

The polymeric resins may be incorporated in the diene containing polymer by conventional mixing procedures, for example, by adding them in a banbury mixer or by adding them to the rubber on a mill. Preferably, when the polymeric resins have higher molecular weights, it is recommended that they be ground to a fine powder to insure adequate dispersion. Such powders may be treated to suppress dust, for example, by the addition of oil, or they can be mixed with a binder, for example, a polymer latex, to produce granules or pellets containing up to 5 percent by weight of a binder. They can also be formulated as pre-dispersions or masterbatched in a diene rubber stock, which pre-dispersions may contain, for example, from 15 to 50 percent by weight of the polymeric resin.

In one embodiment, the rubber composition in the tread contains a sufficient amount of filler to contribute a reasonably high modulus and high resistance to tear. The filler may be added in amounts ranging from 10 to 250 phr. When the filler is silica, the silica is generally present in an amount ranging from 10 to 80 phr. Preferably, the silica is present in an amount ranging from 15 to 70 phr. When the filler is carbon black, the amount of carbon black will vary from 0 to 150 phr. Preferably, the amount of carbon black will range from 0 to 110 phr.

The commonly employed particulate precipitated silica used in rubber compounding applications can be used as the silica in this invention. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930)

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z1165GR and silicas available from Degussa AG with, for example, designations VN2 and VN3, etc.

The processing of the sulfur vulcanizable rubber may be conducted in the presence of a sulfur containing organosilicon compound. Examples of suitable sulfur containing organosilicon compounds are of the formula:

$$Z\text{-}Alk\text{-}S_n\text{-}Alk\text{-}Z \quad (I)$$

in which Z is selected from the group consisting of

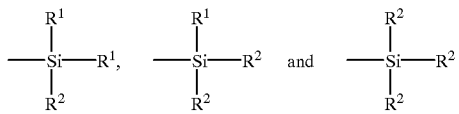 and 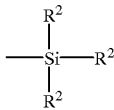

where $R^1$ is an alkyl group of 1 to 4 carbon atoms, cyclohexyl or phenyl;
$R^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

Specific examples of sulfur containing organosilicon compounds which may be used in accordance with the present invention include: 3,3'-bis (trimethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis bis (trihexoxysilylpropyl) disulfide, 3,3'-bis (tri-2"-ethylhexoxysilylpropyl) trisulfide, 3,3'-bis (triisooctoxysilylpropyl) tetrasulfide, 3,3'-bis (tri-t-butoxysilylpropyl) disulfide, 2,2'-bis (methoxy diethoxy silyl ethyl) tetrasulfide, 2,2'-bis (tripropoxysilylethyl) pentasulfide, 3,3'-bis (tricyclohexoxysilylpropyl) tetrasulfide, 3,3'-bis (tricyclopentoxysilylpropyl) trisulfide, 2,2'-bis (tri-2"-methylcyclohexoxysilylethyl) tetrasulfide, (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore, as to Formula I, preferably Z is

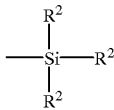

where $R^2$ is an alkoxy of 2 to 4 carbon atoms, with 2 carbon atoms being particularly preferred; Alk is a divalent hydrocarbon of 2 to 4 carbon atoms, with 3 carbon atoms being particularly preferred; and n is an integer of from 3 to 5, with 4 being particularly preferred.

The amount of the sulfur containing organosilicon compound of Formula I in a rubber composition will vary depending on the level of silica that is used. Generally speaking, the amount of the compound of Formula I, if used, will range from 0.01 to 1.0 parts by weight per part by weight of the silica. Preferably, the amount will range from 0.05 to 0.4 parts by weight per part by weight of the silica.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

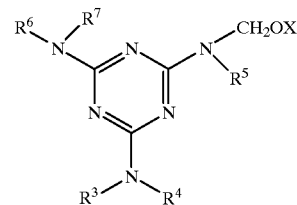

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis-(methoxymethyl) melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that are present will range from about 0.1 phr to 10.0 phr. Preferably, the amount of methylene donor and methylene acceptor ranges from about 2.0 phr to 5.0 phr for each.

The weight ratio of methylene donor to the methylene acceptor may vary. Generally speaking, the weight ratio will range from about 1:10 to about 10:1. Preferably, the weight ratio ranges from about 1:3 to 3:1.

Similar to vulcanizing conventional rubber stocks, the rubber stocks containing the polymeric resins need a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

In addition to the above, conventional rubber additives may be incorporated in the rubber stock of the present invention. The additives commonly used in rubber stocks include plasticizers, curatives, processing oils, retarders, antiozonants, antioxidants and the like. Plasticizers, oils or mixtures thereof are conventionally used in amounts ranging from about 2 to about 150 phr with a range of about 5 to about 130 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, coumarone indene resins and esters such as dibutylphthalate and tricresyl phosphate. Examples of oils are commonly known as highly aromatic process oil, process soybean oil and highly paraffinic process oil. Materials used in compounding which function as an accelerator-activator includes metal oxides such as zinc oxide, magnesium oxide and litharge which are used in conjunction with acidic materials such as fatty acid, for example, stearic acid, oleic acid, myristic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperaturels) than the preceding non-productive mix stage (s). The rubber and polymeric resin are mixed in one or more non-productive mix stages. The terms "non-productive" and "productive" mix stages are well known to those having skill in the rubber mixing art.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with is superheated steam or hot air or in a salt bath.

The following examples are presented in order to illustrate but not limit the present invention.

In the following examples, the Flexsys Rubber Process Analyzer (RPA) 2000 was used to determine dynamic mechanical rheological properties. The curing conditions were 160° C., 1.67 Hz, 15.8 minutes and 0.7 percent strain. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

The compounded rubber sample is placed on the bottom die. When the dies are brought together, the sample is in a pressurized cavity where it will be subjected to a sinusoidal oscillating shearing action of the bottom die. A torque transducer connected to the upper die measures the amount of torque transmitted through the sample as a result of the oscillations. Torque is translated into the shear modulus, G, by correcting for the die form factor and the strain. The RPA 2000 is capable of testing uncured or cured rubber with a high degree of repeatability and reproducibility. The tests and subtests available include frequency sweeps at constant temperature and strain, curing at constant temperature and frequency, strain sweeps at constant temperature and frequency and temperature sweeps at constant strain and frequency. The accuracy and precision of the instrument allows reproducible detection of changes in the compounded sample.

The values reported for the storage modulus, (G'), loss compliance (J") and tan delta are obtained from a strain sweep at 100° C. and 11 Hz following the cure test. These properties represent the viscoelastic response of a test sample to shear deformation at a constant temperature and frequency.

The following examples are presented for the purposes of illustrating and not limiting the present invention. All parts are parts by weight unless specifically identified otherwise.

EXAMPLE 1

Three hundred parts of cyclohexane and 50 parts of anhydrous aluminum chloride were placed into a reactor. While continuously stirring the mixture, 600 parts of a hydrocarbon mixture was slowly added to the reactor over a period of about 60 minutes. The hydrocarbon mixture consisted of 30 percent inert hydrocarbons with the remaining 70 percent by weight of the mixture comprising the following resin forming components:

| Component | Percent |
|---|---|
| Beta-Pinene | 50.0 |
| Dicyclopentadiene | 50.0 |

The temperature of the reaction was maintained in a range of about 25° to 30° C. After an hour of agitation from the time of final addition, the hydrocarbon mixture was added to approximately 4,000 parts of a 25 percent solution of isopropyl alcohol in water to neutralize and decompose the aluminum chloride. The aqueous layer was removed and the resin solution washed with an additional 4,000 parts of the alcohol/water blend.

The resulting resin solution was dried at 70° C. under 29 in of Hg vacuum. The resulting resin was cooled to room temperature to form 400 parts of a hard brittle pale yellow resin having a capillary tube softening point of 135 to 155° C. Small molecule GPC analysis gives a molecular weight distribution of 1.7 percent in the 52,500 MW range, 10.2 percent in the 34,400 MW range, 28.9 percent in the 17,400 MW range, 44.6 percent in the 5630 MW range, 13.8 percent in the 1580 MW range and 0.8 percent in the 550 MW range.

EXAMPLE 2

In this example, various resins were evaluated in a rubber compound.

Rubber compositions containing the materials set out in Tables 1 and 2 were prepared in a BR Banbury™ mixer using two separate stages of addition (mixing); namely, one non-productive mix stage and one productive mix stage. The non-productive stage was mixed at 55 rpm for 2.5 minutes or to a rubber temperature of 180° C., whichever occurred first. The productive stage was mixed at 35 rpm or to a rubber temperature of 120° C., whichever occurred first.

The rubber compositions are identified herein as Samples 1–3. Samples 1 and 2 are considered herein as controls without the use of the DCPD/beta-pinene resin used in the present invention being added to the rubber composition. Samples 1 and 2 each contain commercially available resins. Sample 3 is the resin prepared in Example 1.

The samples were cured at about 150° C. for about 28 minutes or at 160° C. for 15.8 minutes at 1.67 Hz and 0.7 percent strain.

Table 2 illustrates the behavior and physical properties of the cured Samples 1–3.

The DCPD/beta-pinene resin in Sample 3 imparts a dry traction advantage with equal durability over the Coumarone Indene control (Sample 2). Modulus at 300 percent and dynamic modulus (G') at 40 percent strain are improved which should provide better cornering stiffness and handling. Tensile strength is maintained or slightly decreased which will provide at least equal graining and blistering resistance of the tread. The loss compliance (J") and tan delta at 40 percent strain were markedly increased which indicates improved traction. Versus the soft, high traction phenolic resin in control Sample 1, the DCPD/beta-pinene resin provides a substantial improvement in durability and handling as seen in the 300 percent modulus, G' at 40 percent strain and tensile strength with equal or only slightly decreased dry traction as seen in the tan delta and J" at 40 percent strain.

This resin improves the tradeoff between traction and durability that is present with conventional materials.

TABLE 2

| Samples | Ctrl 1 | Ctrl 2 | 3 |
|---|---|---|---|
| Non-Productive | | | |
| Solution SBR[1] | 120 | 120 | 120 |
| Carbon Black[2] | 80.0 | 80.0 | 80.0 |
| Aromatic Oil | 12 | 12 | 12 |
| Stearic Acid | 2.0 | 2.0 | 2.0 |
| Zinc Oxide | 2.0 | 2.0 | 2.0 |
| Antioxidant[3] | 0.7 | 0.7 | 0.7 |
| Phenolic Resin[4] | 25.0 | 0 | 0 |
| Coumarone Indene[5] Resin | 0 | 25.0 | 0 |
| Resin of Example 1 | 0 | 0 | 25.0 |
| Productive | | | |
| Accelerators[6] | 3.5 | 3.5 | 3.5 |
| Accelerator[7] | 0.25 | 0.25 | 0.25 |
| Sulfur | 0.85 | 0.85 | 0.85 |

[1]Solution SBR containing 32 percent styrene, 42 percent vinyl, a Tg of −16° C. and a Mooney Viscosity of 89–95. The solution SBR contained 20 phr of oil and was obtained from The Goodyear Tire & Rubber Company.
[2]$I_2$ = 122 and DBP = 114
[3]Polymerized 1,2-dihydro-2,2,4-trimethylquinoline
[4]Unreactive phenol-formaldehyde resin having a melting point of 106–114° C. (Ring and Ball) which is commercially available from Schenectady Chemical under the designation CRJ-418.
[5]Coumarone Indene Resin having a softening point of 100° C. which is commercially available from Neville Chemical under the designature Cumar™ R-13.
[6]N-cyclohexyl benzothiazole-2-sulfenamide
[7]Tetramethyl thiuram disulfide

TABLE 3

| Sample | Ctrl 1 | Ctrl 2 | 3 |
|---|---|---|---|
| Phenolic resin | 25.0 | 0 | 0 |
| Coumarone Indene Resin | 0 | 25.0 | 0 |
| Resin of Example 1 | 0 | 0 | 25.0 |
| RPA 2000, 15.8 min, 160° C., 0.7% strain, 1.67 Hz | | | |
| T2 (min) | 0.62 | 0.89 | 0.64 |
| T25 (min) | 1.88 | 2.79 | 1.77 |
| T90 (min) | 7.22 | 8.66 | 7.75 |

TABLE 3-continued

| Sample | Ctrl 1 | Ctrl 2 | 3 |
|---|---|---|---|
| Min Torque (dNm) | 0.51 | 0.57 | 0.66 |
| Max Torque (dNm) | 2.05 | 2.55 | 2.70 |
| Delta Torque (dNm) | 1.54 | 1.98 | 2.04 |
| RPA 2000, 11 Hz, 100° C. | | | |
| G' at 40% (kPa) | 407 | 492 | 535 |
| Tan Delta at 40% | 0.257 | 0.235 | 0.339 |
| J" at 40% (1/MPa) | 0.592 | 0.453 | 0.569 |
| UTS, cure 28 minutes @ 150° C. | | | |
| 300% Modulus (MPa) | 4.19 | 4.82 | 5.05 |
| Tensile Strength (MPa) | 10.32 | 12.28 | 11.54 |
| Elongation (%) | 565 | 600 | 605 |

What is claimed is:

1. A rubber stock comprising (1) a rubber selected from the group consisting of natural rubber, rubbers derived from a diene monomer and mixtures thereof, and (2) from 5 to 25 parts by weight per hundred parts by weight of rubber of a polymeric resin composition which contains from 55 to 45 percent by weight of polymeric units derived from dicyclopentadiene and from 45 to 55 percent by weight of polymeric units derived from beta-piene.

2. The rubber stock of claim 1 wherein said rubber derived from a diene monomer or mixtures thereof and is selected from the group consisting of natural rubber, polyisoprene, polybutadiene, polychloroprene, copolymers of isoprene and butadiene, copolymers of styrene and butadiene, copolymers of acrylonitrile and butadiene, copolymers of acrylonitrile and isoprene and blends thereof.

3. The rubber stock of claim 1 werein from 0 to 10 weight percent of the polymeric resin is derived from a monomer other than dicyclopentadiene and beta-pinene.

4. The rubber stock of claim 1 wherein the polymeric resin has a molecular weight distribution ranging from about 550 to about 55,000.

5. The rubber stock of claim 4 wherein the polymeric resin has a molecular weight distribution ranging from about 550 to about 52,500.

6. The rubber stock of claim 1 wherein from 0 to 20 weight percent of the polymeric resin is derived is from a monomer other than dicyclopentadiene and beta pinene.

7. The rubber stock of claim 6 wherein said monomer is selected from the group consisting of alpha-pinene, methyldicyclopentadiene and mixtures thereof.

* * * * *